United States Patent

[11] 3,549,872

[72] Inventor Loyd R. Mc Elveen
Burlington, N.C.

[21] Appl. No. 695,409
[22] Filed Jan. 3, 1968
[45] Patented Dec. 22, 1970
[73] Assignee Western Electric Company, Incorporated
New York, N.Y.
a corporation of New York

[54] CIRCUIT FOR CHANGING A BINARY NUMBER BY ONE
7 Claims, 2 Drawing Figs.

[52] U.S. Cl. .......... 235/168, 235/92; 340/347
[51] Int. Cl. .......... G06f 7/385, G06f 7/50
[50] Field of Search .......... 235/168, 92; 340/347

[56] References Cited

UNITED STATES PATENTS

| | | | |
|---|---|---|---|
| 3,145,293 | 8/1964 | Homan | 235/92(51) |
| 3,230,354 | 1/1966 | Wagner | 235/168X |

OTHER REFERENCES

Electronic Operations in Digital Computers, R. K. Richards, D. Van Nostrand Co., Inc. 1955, Page 195

*Primary Examiner*—Malcolm A. Morrison
*Assistant Examiner*—James F. Gottman
*Attorneys*—R. J. Guenther and William L. Keefauver

ABSTRACT: A binary number may be increased or decreased by one by starting with the least significant digit and taking the complement of each digit up to and includng the first binary ZERO or binary ONE digit, respectively. These functions are performed by a control circuit in combination with a plurality of substantially identical translators each of which has a respective portion of the input member applied to it and is capable of performing these functions on its portion of the number. For each input number, only one portion of the number is operated upon by its translator while less significant portions are complemented.

INVENTOR
L. R. McELVEEN
BY
[signature]
ATTORNEY

CIRCUIT FOR CHANGING A BINARY NUMBER BY ONE

BACKGROUND OF THE INVENTION

1. Field of the Invention

This invention relates to circuits for either increasing or decreasing a binary number by one.

2. Description of the Prior Art

It is known that a binary number may be increased or decreased by one by starting with the least significant digit and taking the complement of each digit up to and including the first binary ZERO or binary ONE, respectively. A relatively fast acting translator that performs these functions comprises AND gates and OR gates as shown in FIG. 1 herein. This translator is relatively fast acting because of its parallel nature and the absence of any carry or borrow function that would otherwise necessitate a ripple-through action.

The number of input leads (the fan-in) for each of the gates of the translator of FIG. 1 is directly related to the number of digits in the input binary number. Because the number of input leads to an actual gate circuit is limited, it is not uncommon for each gate of FIG. 1 to comprise two or more actual gate circuits. Of particular importance is the fact that on a percentage basis the number of such gate circuits increases at a faster rate than the number of input digits. This characteristic not only increases the required circuitry but adversely affects the otherwise fast response of the translator.

SUMMARY OF THE INVENTION

An object of the invention is to retain as much as possible the fast response characteristic of the above-described translator when it is desired to accommodate larger binary numbers.

This and other objects are achieved in accordance with the invention by dividing a binary number into successive groups of digits. Starting with the least significant group of digits, each group of digits is complemented up to, but not including, the group containing the last digit to be complemented. The group that contains this last digit is then translated by one of the above-discussed translators. The response time for this overall action is basically the time required to locate the last digit to be complemented plus the time required for the translator to operate. Unlike the case when the above described translator is expanded to accommodate larger numbers, embodiments of the present invention require very little additional response time when they are expanded because the translators remain unchanged.

A typical embodiment of the invention includes a plurality of translators equal to the number of groups into which the input binary number is divided. It also includes a control circuit, the major portion of which may be divided into a plurality of subcircuits that may be combined with the translators, respectively. As will become apparent in the following description of an embodiment of the invention, a single circuit configuration may be used for a subcircuit-translator combination. This feature is highly desirable from an economical standpoint when large quantities of the embodiment are desired because these configurations may be produced by integrated circuit techniques.

DESCRIPTION OF THE DISCLOSED EMBODIMENT

Figure 1:
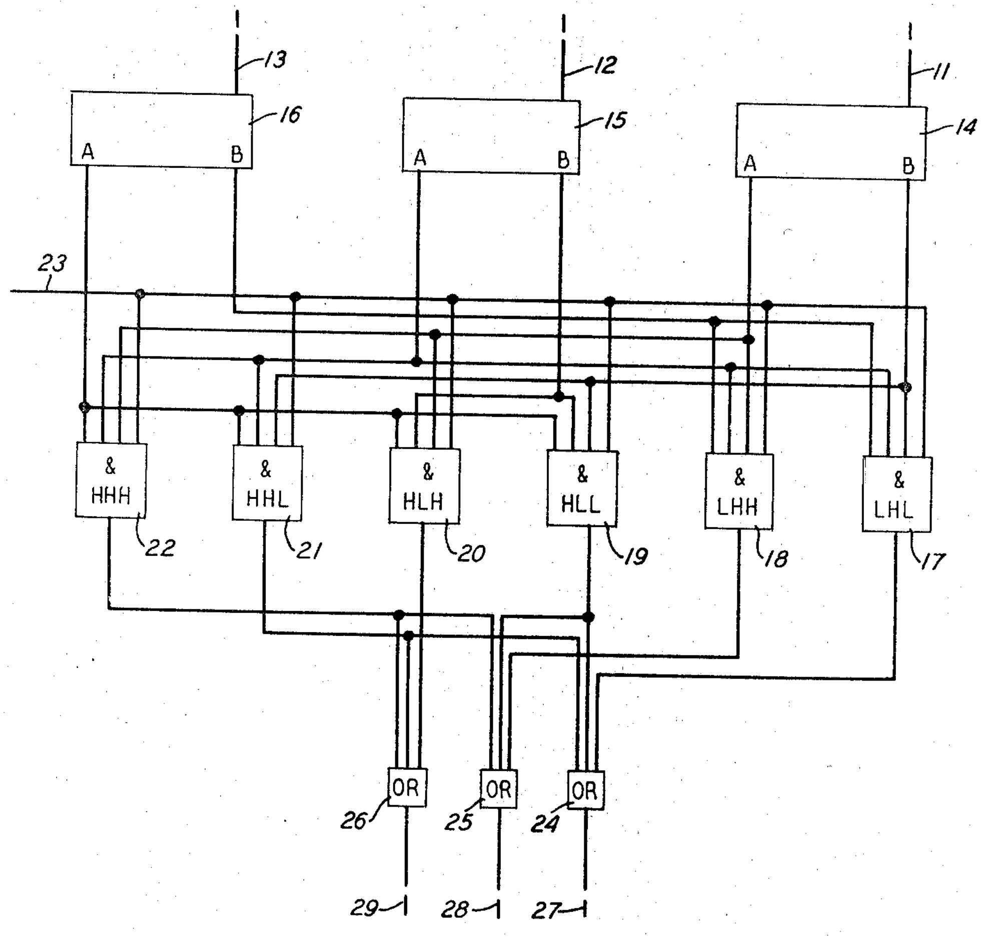
FIG. 1 shows a block diagram of a translator that either adds one to or subtracts one from a binary number.

The block diagram of FIG. 1 is of a translator that may be used either for adding one to or subtracting one from a three digit binary number. High (H) and low (L) voltages representing the binary number are applied to leads 11, 12 and 13. The voltage applied to lead 11 represents the least significant digit of the number while the voltage applied to lead 13 represents the most significant digit. Leads 11, 12 and 13 are connected to three registers 14, 15 and 16, respectively. Each register has an A output terminal on which appears H and L voltages corresponding to those on its input lead and a B output terminal on which appears H and L voltages complementing those on its input lead.

Output terminals A and B of the registers are connected to a plurality of AND gates 17 through 22. An enabling input lead 23 is also connected to each of the AND gates. The output of any one of these AND gates is at an H voltage level only when all of its inputs are at H voltage levels. In particular, when an enabling voltage is present on lead 23, each AND gate output is at an H level only under one set of input conditions to input leads 11, 12 and 13; the remainder of the time the output is at an L voltage level. The output of AND gate 19, for example, is at an H voltage level only when an enabling voltage is present and the voltage levels on leads 13, 12 and 11 are H, L and L, respectively. The letters HLL have therefore been placed in the block representing AND gate 19. Similar letter combinations have been placed in the other AND gate blocks.

The outputs of AND gates 17 through 22 are applied to a plurality of OR gates 24, 25 and 26 which, in turn, have their outputs applied to a plurality of leads 27, 28 and 29, respectively. The output of any of these OR gates is at an H voltage level only when any one or more of its inputs is at an H voltage level. The output of OR gate 24, for example, is at an H voltage level when the output of any one or more of AND gates 17, 19 and 21 is at an H voltage level. The voltage levels on leads 27, 28 and 29 represent the output binary number with the level on lead 27 representing the least significant digit.

The operation of the translator of FIG. 1 for the addition or subtraction of one is now considered.

As appreciated by those skilled in the art, the H voltage level mentioned above may be used to represent either the binary ZERO or the binary ONE with the L voltage level representing the remaining binary value. When the H value is used to represent the binary ZERO, then FIG. 1 operates to add one to the input number. On the other hand, when the H value is used to represent the binary ONE, then the translator operates to subtract one. This is illustrated by the following tables, identified as tables 1 and 2:

TABLE 1

To add one—Let L=1; H=0

| Input number | Input voltage levels | Output voltage levels | Output number |
|---|---|---|---|
| 000 | HHH | HHL | 001 |
| 001 | HHL | HLH | 010 |
| 010 | HLH | HLL | 011 |
| 011 | HLL | LHH | 100 |
| 100 | LHH | LHL | 101 |
| 101 | LHL | LLH | 110 |
| 110 | LLH | LLL | 111 |

TABLE 2

To subtract one—Let H=1; L=0

| Input number | Input voltage levels | Output voltage levels | Output number |
|---|---|---|---|
| 111 | HHH | HHL | 110 |
| 110 | HHL | HLH | 101 |
| 101 | HLH | HLL | 100 |
| 100 | HLL | LHH | 011 |
| 011 | LHH | LHL | 010 |
| 010 | LHL | LLH | 001 |
| 001 | LLH | LLL | 000 |

Before beginning with the description of the disclosed embodiment of the invention, it should be noted that a translator of the same general configuration of that of FIG. 1 may be produced wherein the binary ZERO and ONE digits for adding or subtracting are represented by voltage levels opposite to those described. Although such a translator requires an additional AND gate, it is nevertheless straightforward in view of FIG. 1 and therefore is not illustrated.

Figure 2:
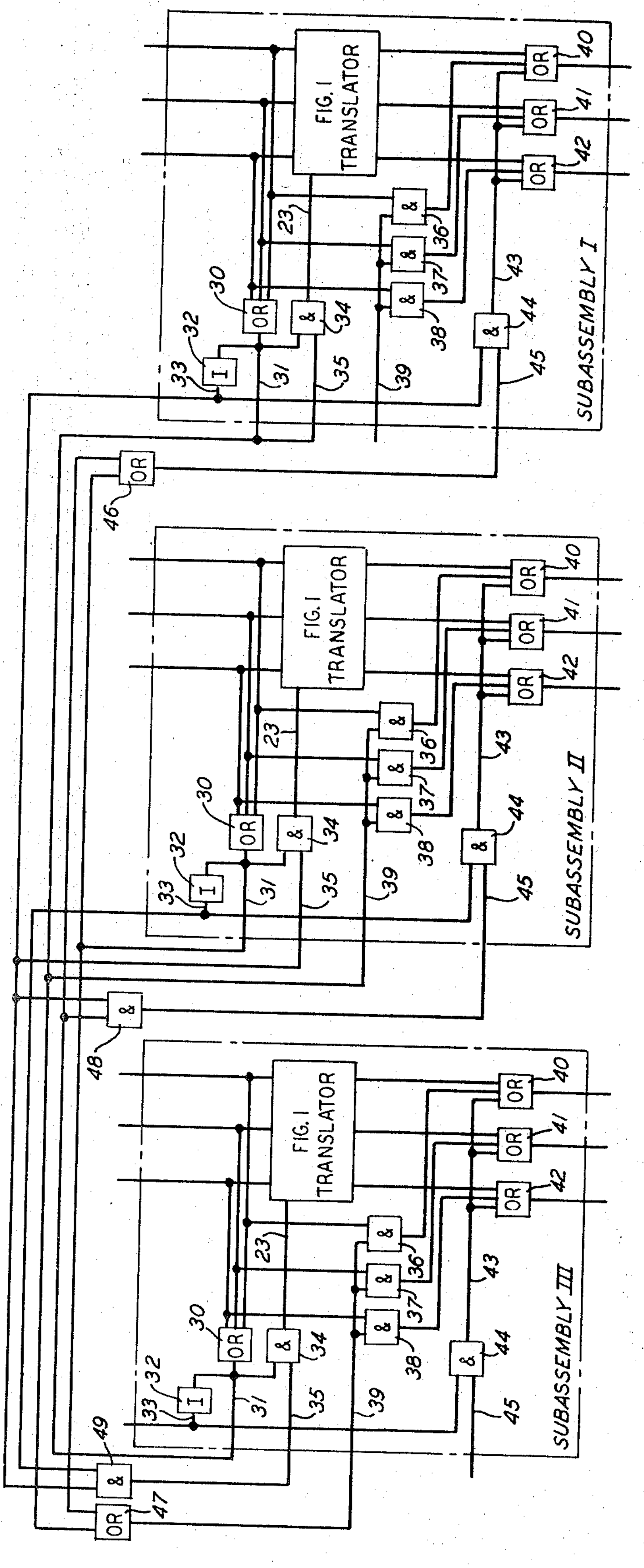
FIG. 2 shows a block diagram of an embodiment of the invention.

An embodiment of the invention for either adding one to or subtracting one from a nine digit binary number is disclosed in block diagram form in FIG. 2. This embodiment comprises three of the translators disclosed in FIG. 1 and a control circuit formed of inverters and AND and OR gates. Because this embodiment readily lends itself to integrated circuitry, the three translators and most of the control circuit have been illustrated as comprising three identical subassemblies identified as I, II, and III. Furthermore, the least significant digit of subassembly I is the least significant digit of the nine digit input binary number.

Each of the subassemblies includes an OR gate 30 that produces an H output level on a lead 31 when any one of the inputs to its FIG. 1 translator is at an H level. The voltage level on lead 31 is inverted (that is, and H to an L level or an L to an H level) by an inverter 32 and made available on a lead 33. Lead 31 is also connected to one input terminal of an AND gate 34 whose output terminal in turn in is connected to lead 23 of the translator. An input lead 35 is also connected to an input terminal of the AND gate.

Each subassembly also includes three AND gates 36, 37 and 38. An input lead 39 is connected to an input terminal of each of the AND gates, while their remaining input terminals are connected to respective input leads to the subassembly translator. The output terminals of these three AND gates are connected to input terminals of three OR gates 40, 41 and 42, respectively. The output leads of the subassembly translator are also connected to input terminals of the three OR gates, respectively. These OR gates have further input terminals all of which are connected by a lead 43 to the output terminal of AND gate 44. AND gate 44 receives inputs from inverter 32 and an input lead 45.

The portion of the control circuit that does not form parts of the subassemblies comprise two OR gates 46 and 47, two AND gates 48 and 49 and interconnecting leads. OR gate 46 applies an H level voltage to lead 45 of subassembly I when either or both of leads 31 of subassemblies II and III are at H levels. OR gate 47 applies an H level voltage to lead 39 of subassembly III when either or both of leads 31 of subassemblies I AND II are at H levels, AND gate 48, on the other hand, applies an H level voltage to lead 45 of subassembly II when both lead 33 of subassembly I and lead 31 of subassembly III are at H voltage levels. An H level voltage is applied to lead 35 of subassembly III by AND gate 49 when leads 33 of subassemblies I and II are both at H voltage levels. As for the interconnecting leads, lead 33 of subassembly I is connected to lead 35 of subassembly II and lead 31 of subassembly I is connected to lead 39 of subassembly II.

Several elements of FIG. 2 are not being used or are unnecessary. In particular, AND gates 34, 36, 37 and 38 of subassembly I and inverter 32 and AND gate 44 of subassembly III are not required and therefore may be eliminated. When using integrated circuits, however, it is frequently less expensive to make as many subassemblies alike as possible and then to neglect those portions not required. The embodiment has been disclosed with this in mind in order to demonstrate one of the features of the invention.

The operation of FIG. 2 may be readily appreciated by first considering, under various input conditions, the various combinations of voltage levels present on important leads within the embodiment. The leads believed to be of particular importance are: leads 23 which enable the translators, leads 39 which cause the input voltage levels to be passed to the output leads and leads 43 which cause all output leads in respective subassemblies to be at H voltage levels. Furthermore, there are eight possible combinations of levels on leads 23, 39 and 43 as believed apparent by considering the fact that all of these levels depend upon the levels on OR gates 30. The following table identified as table 3 sets forth all of these combinations:

TABLE 3

| OR gate 30 output level in subassembly | | | Lead having a H voltage level in subassembly | | |
|---|---|---|---|---|---|
| III | II | I | III | II | I |
| L | L | L | None | None | None |
| L | L | H | 39 | 39 | 23 |
| L | H | L | 39 | 23 | 43 |
| L | H | H | 39 | 39 | 23 |
| H | L | L | 23 | 43 | 43 |
| H | L | H | 39 | 39 | 23 |
| H | H | L | 39 | 23 | 43 |
| H | H | H | 39 | 39 | 23 |

With table 3 in mind, it is possible to rapidly appreciate the embodiment operation in response to a set of input conditions. Consider, for example, an input of LHL LHL LHL. This corresponds to the last line of the above table (OR gate 30 outputs are HHH). The translator of subassembly I is therefore enabled and translates its portion of the input number. The other subassemblies merely pass the input levels to their output leads. The output is therefore LHL LHL LLH. This example and several more are set forth in the following table identified as table 4:

TABLE 4

| Input to subassembly | | | Lead having an H level voltage in subassembly | | | Output from subassembly | | |
|---|---|---|---|---|---|---|---|---|
| III | II | I | III | II | I | III | II | I |
| LHL | LHL | LHL | 39 | 39 | 23 | LHL | LHL | LLH |
| LHL | LHL | LLL | 39 | 23 | 43 | LHL | LLH | HHH |
| LHL | LLL | LLL | 23 | 43 | 43 | LLH | HHH | HHH |
| LLL | LLL | LLL | None | None | None | LLL | LLL | LLL |

As before, when the L voltage level equals a binary ONE and the H voltage level equals a binary ZERO, this embodiment adds one to an input number. Conversely, when these conditions are reversed, the embodiment subtracts one from an input number. When adding, for example, the input on the second line of table 4 becomes 101101111 and the output becomes 101110000, which is one greater than the input number. On the other hand, for subtraction this input becomes 010010000 and the output becomes 010001111, which is one less than the input.

Binary numbers having a greater number of digits are accommodated by expanding the embodiment of FIG. 2. For example, additional subassemblies and AND gates 48 may be connected between subassemblies II and III. The same pattern of interconnections is followed with the expanded version. In particular, all leads 31, except the that from the least significant group subassembly I, are connected to OR gate 46; all leads 31, except that from the most significant group subassembly III are connected to OR gate 47; all leads 33 except that from the most significant group subassembly III are connected to AND gate 49; and all leads 33 from less significant group subassemblies and all leads 31 from more significant group subassemblies are connected to AND gates 48.

With the above description in mind, it is believed that one may readily appreciate the small loss, if any, of response time when expanding the disclosed embodiment so as to accommodate larger numbers. In particular, there is no loss in response time produced as a result of additional subassemblies because changes are not made to the subassemblies and, furthermore, they all essentially operate in parallel. The only time a loss does occur is when the number of leads (fan-in) to OR gates 46 and 47 and AND gates 48 and 49 requires additional gate circuits to implement these gates. As readily appreciated by those skilled in the art, this loss in response time as a function of input number size is much less than that when expanding the configuration of FIG. 1.

Another feature of the invention is that is readily lends itself to fast acting forward or reverse counting. For example, each time a count is to be registered, the output of FIG. 2 may be strobed into a store which, in turn, has its output applied to the input of FIG. 2.

Although only one embodiment of the invention has been discussed in detail, it is to be understood that various other embodiments may be devised by those skilled in the art without departing from the spirit and scope of the invention.

I claim:

1. A logic circuit combination comprising:

a plurality of translators each of which is assigned a unique degree of significance with respect to all other of the translators and, furthermore, each of which has a set of input terminals for receiving a set of input binary level voltages representing a first binary number, a set of output terminals and an enabling input terminal which, when energized, causes a set of output binary level voltages representing a second binary number differing by one from said first binary number to appear on said output terminals;

a plurality of first means associated with said translators, respectively, with each of said first means having input terminals connected to the input terminals of its associated translator and producing outputs indicative of the presence and absence of input voltages of said first level on the input terminals of its associated translator;

a plurality of second means associated with said translators, respectively, with each of said second means having an output terminal connected to the enabling input terminal of its associated translator and input terminals connected to said first means of its associated translator and to said first means of all less significant translators, to enable its translator when it has an input voltage of a first level and none of the less significant translators has an input voltage of said first level;

a plurality of means associated with all but the least significant of said translators, respectively, with each means connected between the input terminals and the output terminals of its associated translator and having an enabling input connected to said first means associated with all translators less significant than its associated translator to replace the output voltages of any one of the translators with its input voltages when there is a less significant translator that has an input voltage of said first level; and a plurality of means associated with all but the most significant of said translators, respectively, with each means connected between its associated translator output terminals and all of said first means to replace the output voltages of any one of the translators with voltages of said first level when its input voltages and those of any less significant translators do not include an input voltage of said first level and there is a more significant translator that has an input voltage of said first level.

2. A logic circuit combination comprising:

a plurality of subassemblies each of which is assigned a unique degree of significance with respect to all other of the subassemblies;

each of said subassemblies including a translator having an enabling input terminal which when enabled translates a set of input binary level voltages on a set of input terminals into a set of output binary level voltages on a set of output terminals where said output voltages represent a binary number differing by one from a binary number represented by said input voltages;

first means in each subassembly which means has input terminals connected to the input terminals of the translator of that subassembly and produces outputs indicative of the presence and absence of input voltages of said first level on the input terminals of that translator;

means in each subassembly which means has an output terminal connected to the enabling input terminal of the translator of that subassembly and input terminals connected to said first means in that subassembly and all less significant subassemblies to enable that translator when its input voltages include a voltage of said first level and there is not a translator in a less significant subassembly that has an input voltage of a first level;

means in each subassembly other than the least significant subassembly which means is connected between the input terminals and the output terminals of the translator of that subassembly and, furthermore, has an enabling input terminal connected to all of said first means in less significant subassemblies to replace the output voltages of that translator with its input voltages when there is a translator in a less significant subassembly that has an input voltage of said first level; and means in each subassembly other than the most significant subassembly which means is connected between the output terminals of the translator of that subassembly and all of said first means to replace the output voltages of that translator with voltages of said first level when that translator and those in any less significant subassemblies do not include an input voltage of said first level and there is a translator in a more significant subassembly that has an input voltage of said first level.

3. A logic circuit combination comprising:

a plurality of subassemblies each of which is assigned a unique degree of significance with respect to all other of the subassemblies;

each of said subassemblies having a set of input leads for receiving a set of binary level voltages representing a first binary number and a set of output leads for making available a set of binary level voltages representing a second binary number;

first means in each subassembly which means has input leads connected to the input leads of that subassembly to produce outputs indicative of the presence and absence of a particular one of said binary level voltages on the input leads of that subassembly;

means in each subassembly which means is connected between said input and output leads of that subassembly and, furthermore, is connected to said first means in that subassembly and all less significant subassemblies to produce on the output leads of said that subassembly voltages representing a binary number one different from said first binary number when said particular one of said binary level voltages appears on one of said that subassembly input leads and there is not a less significant subassembly that has said particular one of said binary level voltages on one of its input leads;

means in each subassembly which means is connected between said input and output leads of that subassembly and, furthermore, is connected to said first means in all less significant subassemblies to produce on the output leads of said that subassembly the voltages appearing on the input leads of said that subassembly when there is a less significant subassembly that has said particular one of said binary voltages on one of its input leads; and means in each subassembly other than the most significant subassembly which means is connected to the output terminals of that subassembly and all of said first means to produce on the output leads of said that subassembly said particular one of said binary voltages when said particular one of said binary voltages do not appear on the input leads of said that subassembly nor the input leads of any less significant subassemblies and there is a more significant subassembly that has said particular one of said binary voltages on one of its input leads.

4. A logic circuit combination comprising:
a plurality of subassemblies each of which is assigned a unique degree of significance with respect to all other of the subassemblies;
each of said subassemblies having a set of input terminals and a set of output terminals and, furthermore, including a translator connected between said sets of terminals and having an enabling input terminal which when enabled translates a set of input binary level voltages representing a first binary number into a set of output binary level voltages representing a second binary number differing by one from said first binary number;
means in the least significant of said subassemblies and connected between the input terminals and the enabling input terminal of that subassembly to enable its translator when its input voltages include a voltage of a first level;
means in each of the remaining subassemblies connected between the input terminals and the enabling input terminal of the translator of that subassembly and, furthermore, to all less significant subassemblies to enable the translator of said that subassembly when its input voltages include a voltage of said first level and none of the translators in less significant subassemblies has an input voltage of said first level;
means in each of the subassemblies other than the least significant one and connected between all less significant subassemblies and the output terminals of the translator of its subassembly to replace the output voltages of that translator with its input voltages when any of the translators in less significant subassemblies has an input voltage of said first level;
means in said least significant subassembly and connected between the input terminals and the output terminals of the translator of that subassembly and, furthermore, to all of the remaining subassemblies to replace the output voltages of that translator with voltages of said first level when its input voltages do not include a voltage of said first level and at least one of the remaining translators has an input voltage of said first level; and
means in each of said subassemblies other than said most and least significant ones and connected between the input terminals and the output terminals of the translator of that subassembly and, furthermore, to all of the remaining subassemblies to replace the output voltages of that translator with voltages of said first level when that translator and those in less significant subassemblies do not include an input voltage of said first level and at least one translator in the more significant subassemblies has an input voltage of said first level.
5. A logic circuit combination comprising:
a plurality of translators each of which is assigned a unique degree of significance with respect to all other of the translators and, furthermore, each of which has an enabling input which, when enabled, translates a set of input binary level voltages appearing on a set of input terminals and representing a first binary number into a set of output binary level voltages appearing on a set of output terminals and representing a second binary number differing by one from said first binary number;
a plurality of first means associated with said translators, respectively, with each of said first means having input terminals connected to the input terminals of its associated translator and producing outputs indicative of the presence and absence of input voltages of a particular one of said binary levels on the input terminals of its associated translator;
means connected between the first means and the enabling input terminal of the least significant of said translators to enable the least significant of said translators when it has an input voltage of a first level;
a plurality of means associated with the remaining translators, respectively, and connected between the enabling input terminal of its associated translator and the first means of its associated translator and all less significant translators to enable any one of the remaining translators when it has an input voltage of said first level and none of the less significant translators has an input voltage of said first level;
a plurality of means associated with all but the least significant of said translators, respectively, and connected between the input and output terminals of its associated translator and, furthermore, to the first means of all less significant translators to replace the output voltages of any one of the translators other than the least significant one with its input voltages when any of the less significant translators has an input voltage of said first level;
means associated with the least significant of said translators and connected between the input terminals and the output terminals of said least significant translator and, furthermore, to all of said first means to replace the output voltages of said least significant translator with voltages of said first level when its input voltages do not include a voltage of said first level and at least one of the remaining translators has an input voltage of said first level; and
a plurality of means associated with all but the most and the least significant of said translators, respectively, and connected between the output terminals of its associated translator and all of said first means to replace the output voltages of any one of the translators other than said most and least significant ones with voltages of said first level when its input voltages and those of less significant translators do not include an input voltage of said first level and the input voltages of at least one more significant translator has an input voltage of said first level.
6. A logic circuit combination comprising:
a plurality of subassemblies each of which is assigned a unique degree of significance with respect to all other of the subassemblies;
each of said subassemblies having a set of input leads for receiving a set of binary level voltages representing a first binary number and a set of output leads for making available a set of binary level voltages representing a second binary number;
first means in the least significant of said subassemblies and connected between the input and output leads of that subassembly to produce on its output leads voltages representing a binary number one different from said first binary number when a voltage of a first level appears on one of its input leads;
second means in said least significant subassembly and connected between the input leads of all subassemblies and the output leads of said least significant subassembly to produce on the output leads of said least significant subassembly voltages of said first level when a voltage of said first level does not appear on its input leads and a voltage of said first level appears on one of the input leads of one of the remaining subassemblies;
means in each of the subassemblies other than said least significant one and connected between the input and output leads of its associated subassembly and, furthermore, to the input leads of any of the less significant subassemblies to produce on the output leads of its associated subassembly voltages representing a binary number one different from said first binary number when a voltage of said first level appears on one of the input leads of that subassembly and a voltage of said first level does not appear on the input leads of any of the less significant subassemblies;
means in the most significant of said subassemblies and connected between its subassembly output terminals and the input terminals of all the other subassemblies to produce on its subassembly output leads the voltages appearing on its input leads when at least one of the other subassemblies has an input voltage of said first level on one of its input leads;

means in each of the subassemblies other than the most and the least significant ones and connected between the input and output leads of its subassembly and, furthermore, to the input leads of all less significant subassemblies to produce on its output leads the voltages appearing on its input leads when any of the less significant subassemblies has an input voltage of said first level on one of its input leads; and means in each of said subassemblies other than said most and least significant ones and connected between its subassembly output leads and the input leads of all said subassemblies to produce on its subassembly output leads voltages of said first level when voltages of said first level do not appear on its input leads nor the input leads of less significant subassemblies and a voltage of said first level appears on the input leads of the more significant subassemblies.

7. A logic circuit combination for receiving an input binary number on input leads and producing an output binary number on output leads where the number on said output leads differs by one from that on said input leads, said combination comprising:

*n* translators each having a control terminal, input leads for receiving a respective portion of said number on said combination input leads, and output leads at which a binary number, one different from said input number portion, appears when said control terminal is enabled;

a plurality of OR gates connected between said translator output leads and said combination output leads, respectively;

*n* first means associated with said translators, respectively, and connected to their input leads with each of said means producing an output when its translator input number portion includes a binary digit of a first type;

second means connected between the input leads and the OR gates of the translator associated with the most significant portion of said input number and having input enabling leads which, when enabled, cause the outputs of these OR gates to comprise said input number portion applied to said translator;

third means connected to the OR gates of the translator associated with the least significant portion of said input number and having input leads which, when enabled, causes these OR gates to produce binary digits of said first type;

pairs of said second and third means similarly connected to the remaining ($n$-2) translators and their associated OR gates, respectively;

*n* fourth means associated with said translators, respectively, and connected with each fourth means between its translator control terminal, its translator first means and the first means of any less significant translators to enable its translator when its first means output is present and all less significant translator first means outputs are absent;

($n$-1) fifth means connecting, respectively, each of said second means to the first means in all less significant translators to enable each of said second means when a first means output is present in at least one less significant translator; and ($n$-1) sixth means connecting, respectively, each of said third means to all of said first means to enable each of said third means when its translator and all less significant translator first means outputs are absent and all more significant translator first means outputs are present.